United States Patent
Graves

(10) Patent No.: US 9,003,231 B1
(45) Date of Patent: Apr. 7, 2015

(54) SYSTEM FOR INSTANTIATING SERVICE INSTANCES FOR TESTING IN A KNOWN STATE

(75) Inventor: Joseph Graves, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 190 days.

(21) Appl. No.: 13/447,935

(22) Filed: Apr. 16, 2012

(51) Int. Cl.
*G06F 11/00* (2006.01)
*G06F 11/14* (2006.01)

(52) U.S. Cl.
CPC .................................. *G06F 11/1417* (2013.01)

(58) Field of Classification Search
CPC ....... G06F 11/25; G06F 11/26; G06F 11/267; G06F 11/273; G06F 11/277; G06F 11/3447; G06F 11/3457; G06F 11/36; G06F 11/3664
USPC .................. 714/25, 27, 28, 33, 37, 40, 41, 43
See application file for complete search history.

(56) References Cited

U.S. PATENT DOCUMENTS

| | | |
|---|---|---|
| 6,219,659 B1 | 4/2001 | Kliorin |
| 7,103,647 B2 | 9/2006 | Aziz |
| 7,246,224 B2 | 7/2007 | Rothman et al. |
| 7,373,451 B2 | 5/2008 | Lam et al. |
| 7,747,709 B2 | 6/2010 | Behrendt et al. |
| 7,761,860 B2 | 7/2010 | Koo et al. |
| 2005/0004942 A1 | 1/2005 | Madsen et al. |
| 2006/0053418 A1 | 3/2006 | Lundstrom et al. |
| 2009/0210858 A1 | 8/2009 | Son et al. |
| 2009/0249284 A1* | 10/2009 | Antosz et al. ................ 717/104 |
| 2010/0082560 A1 | 4/2010 | Wiger et al. |
| 2011/0219146 A1* | 9/2011 | Jacobson et al. .................. 710/8 |
| 2012/0030514 A1* | 2/2012 | Lawrance et al. ............ 714/38.1 |
| 2012/0331441 A1* | 12/2012 | Adamson ...................... 717/102 |
| 2013/0219217 A1* | 8/2013 | Seren et al. ..................... 714/27 |

OTHER PUBLICATIONS

Warren, Ian and Sommerville, Ian, "Dynamic Configuration Abstraction," Cooperative Systems Engineering Group, Lancaster University Computing Department, 1995, 16 pages.
Chang, Fay, et al., "Bigtable: A Distributed Storage System for Structured Data," from the Proceedings of the 7th USENIX Symposium on Operating Systems Design and Implementation, vol. 7, 2006, 14 pages.
Van Den Berg, Roy, "Formal Interfaces for Test Frameworks: A Configuration Language based on Typed Feature Models," Master's Thesis, Eindhoven University of Technology Computer Science and Engineering, Nov. 2010, 75 pages.
Bokharouss, Ibrahim, "GCL Viewer: A study in improving the understanding of GCL programs," Master Thesis, Technische Universiteit Eindhoven, 2008, 107 pages.

(Continued)

*Primary Examiner* — Joseph D Manoskey
(74) *Attorney, Agent, or Firm* — Fish & Richardson P.C.

(57) ABSTRACT

It is frequently difficult to generate multiple separate instances of a complex system. It is also difficult to restore the data state of these instances to a known state. Embodiments simplify the process by classifying the complex system under test in terms of its state components and service, by creating a new instance for testing, and by using copy-on write approaches to restore that new instance to the desired known state.

20 Claims, 13 Drawing Sheets

(56) References Cited

OTHER PUBLICATIONS

"Apache Synapse," from Wikipedia, the free encyclopedia, http://en.wikipedia.org/wikie/Apache_Synapse, last modified Aug. 27, 2011, downloaded Oct. 19, 2011, 2 pages.

"Apache Synapse ESB—Configuration", Apache Software Foundation, http://synapse.apache.org/Synapse _Configuration_Language.html, last published on Jan. 7, 2011, downloaded Oct. 20, 2011, 29 pages.

* cited by examiner

Sample GCL Sandbox Configuration File 300

```
vars {
   name = "d2d_integ"
} sandbox DataCombinerToDataExporter {
   instance_name = vars.name
   sandlet DataCombiner = datacombiner.DataCombiner {
      service_components {
         pipeline = null
         matching_service = null
         dry_run = null
      }
   }
   sandlet MasterRepository = masterrepository.
   MasterRepository {} sandlet DataExporter = dataexporter.DataExporter {
      params {
         borg_cell = "mh"
      }
   }
}
```

FIG. 3

SYSTEM FOR INSTANTIATING SERVICE INSTANCES FOR TESTING IN A KNOWN STATE

BACKGROUND

1. Field

This field is generally related to management of multiple instances of a complex system.

2. Background

In computer security, a sandbox is a security mechanism for separating running programs. It is often used to execute untested code, or untrusted programs from unverified third-parties, suppliers, untrusted users and untrusted websites.

The sandbox typically provides a tightly-controlled set of resources for guest programs to run in, such as scratch space on disk and memory. Network access and the ability to inspect the host system or read from input devices are usually disallowed or heavily restricted. In this sense, sandboxes are a specific example of virtualization.

Sandboxes offer many advantages for ensuring that a program runs in a secure manner. For example, the restrictions that a sandbox places on a program or set of programs that are undergoing testing can be invaluable. It is possible to perform a test and also be assured that a program cannot jeopardize the integrity of system resources. This assurance is possible because a test that runs in a sandbox restricts access to resources in a manner that prevents accidental or malicious use of resources that would otherwise pose a danger. For example, a sandbox can run a test in a way that prevents release of private information, or prevents accessing a resource such as memory in a way that could corrupt information stored in memory.

BRIEF SUMMARY

A computer-implemented method, system, and computer-readable storage medium are provided for managing sandbox environment instances. A first testing sandbox environment instance is instantiated to a known state based on a golden state definition, wherein the golden state definition specifies configurations of at least one component and at least one service for the first testing sandbox environment instance. A testing operation is performed using the first testing sandbox environment instance by changing the configuration of at least one component or service of the first testing sandbox environment instance without changing the golden state definition. The first testing sandbox environment instance is restored to the known state using the golden state definition to only restore configurations of the at least one component or service of the first testing sandbox environment instance that were changed.

Further embodiments, features, and advantages of the embodiments, as well as the structure and operation of the various embodiments are described in detail below with reference to accompanying drawings.

BRIEF DESCRIPTION OF THE FIGURES

The accompanying drawings, which are incorporated herein and form a part of the specification, illustrate the present embodiments and, together with the description, further serve to explain the principles of the embodiments and to enable a person skilled in the pertinent art to make and use the embodiments.

FIG. 3 is a listing of a sample GCL Sandbox Configuration File.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1:
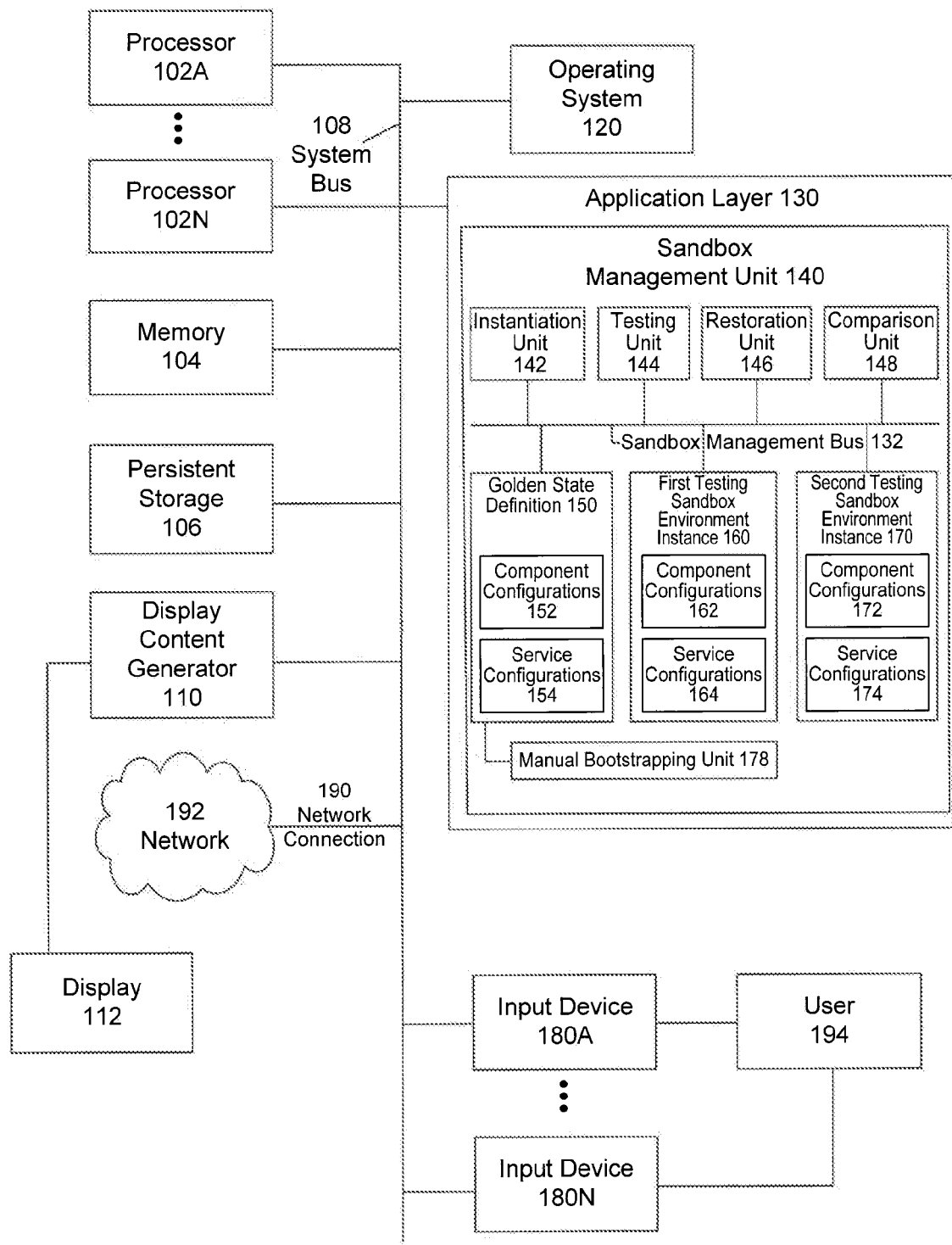
FIG. 1 is a diagram illustrating a system according to an embodiment.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Even when sandboxes are used, it is frequently difficult to bring up multiple separate instances of a complex system. It is also difficult to restore the data state of these instances to a known state. Further, in order to be able to run a test in a sandbox, it is helpful to ensure that the sandbox begins at a known configuration. However, at present it is difficult to ensure that a testing sandbox begins at a known configuration, or perform other tasks related to managing testing sandboxes, such as restoring them to the known configuration after testing, or comparing multiple testing sandboxes that originated with the same known state.

Thus, the present state of the art lacks approaches that would facilitate and simplify managing instances of a complex system in a way that would be useful in areas such as automated testing and evaluation of such systems.

Embodiments described herein simplify the process by classifying a complex system under test in terms of its state components and services, by creating a new instance for testing, and by using copy-on-write approaches to restore that new instance to the desired known state.

Embodiments utilize a configuration language (such as General Configuration Language (GCL)) to specify both how the system under test is composed in terms of the different components that hold data state (e.g., bigtables and file systems) and in terms of running services or jobs that the system under test provides. Specific instances are also defined in the configuration languages, yielding a set of unique names for a new instance. The framework provides a command to instantiate the new instance from an existing instance by providing two configuration files (one old and one new).

Examples described herein make reference to GCL. However, as discussed below, the use of GCL is not a requirement. Any approach that allows for specification and implementation of "snapshot" (to bring up an instance in a known state) and "delete" functions may be used, as would be evident to one of skill in the art.

More details about how embodiments are structured and operated are provided below. However, in general, embodiments operate to provide the functionality of a sandbox manager.

A sandbox manager may be used according to embodiments to configure personal environment instances for a given set of components. These environments are initialized to a known state, thus bypassing the need to repeatedly bootstrap test data and allowing for tests that can expect a known outcome given a starting state and a series of actions.

For any supported component, a sandbox manager allows users to quickly create and delete a personal sandbox environment. This functionality includes snapshotting the state from a golden state definition, creating the configurations for defined services, starting and stopping services, and removing the sandbox and its underlying state.

For example, the tool supports the following ways to restore state from base components. These are only examples, and some embodiments may support only a subset of these ways of restoring state, or include other similar ways of restoring state. Example approaches include: snapshotting sets of bigtables from existing bigtables in the same cell, snapshotting an existing Pinax cluster, copying files and directories, configuring ST-BTI schemas after snapshotting bigtables, and/or setting borg config dependencies to other endpoints of sandboxed components.

Also, in one embodiment, tool configurations are written in Python, so the tool may be extended to support any custom Python extension (so a user can write his or her own approach to configuring an environment).

If a user requests a sandbox for multiple components in the same request, and the configuration of a single sandbox component points to defined endpoints in the other components (e.g. service BNS names, tables, etc.), then the sandbox manager will automatically use the other components' endpoints when generating the configurations.

There are several approaches to using a sandbox manager when testing. One approach is to use a command-line interface. Another approach is to use an automated testing framework. A sandbox manager can be adapted to work in conjunction with a variety of testing frameworks while still providing its advantageous features.

FIG. 1 is a diagram illustrating a system according to an embodiment. A computer system 100 provides for managing sandbox environment instances.

Each of the constituent parts of a system embodiment may be implemented on any computer system 100. Such computer system 100 can include, but is not limited to, a personal computer, mobile device such as a mobile phone, workstation, embedded system, game console, television, set-top box, or any other computer system 100. Further, computer system 100 can include, but is not limited to, a device having a processor and memory for executing and storing instructions. Software may include one or more applications and an operating system. Hardware can include, but is not limited to, a processor, memory and graphical user interface display. Computer system 100 may also have multiple processors and multiple shared or separate memory components. For example, computer system 100 may be a clustered computing environment or a server farm.

Computer system 100 is coupled to a display 112, which displays content from display content generator 110 on behalf of computer system 100. Display content generator 110 generates content that, when displayed, facilitates interaction between a user 194 and the remainder of computer system 100. For example, display content generator 110 may provide a Graphical User Interface (GUI) to user 194. Additionally, computer system 100 is communicatively coupled to one or more input devices 180A-180N that can receive one or more inputs (e.g., touch inputs, keyed inputs, etc.) from user 194.

Modules or instructions that constitute operative parts of embodiments may utilize any type of structured memory, including a persistent memory. In examples, each data storage infrastructure may be implemented as a relational database.

It should be noted that computer-readable storage medium embodiments may include any physical medium which is capable of having instructions encoded thereon that may subsequently be used by a processor to implement methods described herein. Example physical media may include floppy discs, optical discs (e.g. CDs, mini-CDs, DVDs, HD-DVD, Blu-ray), hard drives, punch cards, tape drives, flash memory, and memory chips (such as RAM). However, any other type of tangible, persistent storage that can serve in the role of providing instructions to a processor may be used to store the instructions in these embodiments.

Processing tasks in the embodiment of FIG. 1 are carried out by one or more processors 102A-102N. It should be noted that any type of processing technology may be used here, including multi-core processors, multiple processors, or distributed processors. In order to manipulate data, processors 102A-102N access a memory 104 via system bus 108. For data which needs to be stored more permanently, processors 102A-102N access persistent storage 106. Processors 102A-102N, memory 104 and persistent storage 106 operate in conjunction with operating system 120 to provide basic functionality for computer system 100. Operating system 120 provides support functionality for an application layer 130. In the context of applications layer 130, computer system 100 hosts a sandbox management unit 140.

Sandbox management unit 140 in application layer 130 may have access to the Web over a network 192 via a network connection 190. Computer system 100 may be a conventional computer such as a desktop or laptop PC, but it may additionally be any device with processors 102A-102N and memory 104 such as a game console, a tablet, a netbook or a smartphone that can perform functionality to manage sandbox environment instances. Computer system 100 as shown in FIG. 1 may be organized around a system bus 108, but any type of infrastructure that allows the infrastructural elements of computer system 100 to communicate with and interact with each other may be used to function as this part of computer system 100.

Computer system 100 may use network connection 190 to communicate with other processing machines via network 192. Network connection 190 may be a wired connection such as Ethernet, token ring, or optical, DSL, cable, or phone connections in conjunction with an appropriate modem. Similarly, appropriate wireless technology may be used to act as network connection 190 to access network 192. Network 192 may be the Internet, a local area network, or any other network 192 of machines with which computer system 100 may exchange data.

In addition to the constituent parts of computer system 100 that have already been discussed, sandbox management unit 140 within application 130 may include a variety of constituent subsystems that may operate in conjunction with other parts of computer system 100 (such as processors 102A-102N, memory 104, and persistent storage 106) to provide functionality related to management of multiple separate instances of a complex system. While this functionality may be automated, it may also potentially involve user interaction through producing display content at display content generator 110 which is displayed at display 112 to user 194, who may interact with other components of computer system 100 by providing inputs at input device 180A-180N.

The subsystems included in sandbox management unit 140 may include a variety of functional units and data structures that work together to provide the functionality of embodiments. Those may include an instantiation unit 142, a testing unit 144, a restoration unit 146, a comparison unit 148, a golden state definition 150, a first testing sandbox environment instance 160, a second testing sandbox environment instance 170, and a manual bootstrapping unit 178. These subsystems will now be discussed in greater detail to discuss their structures and functions. It may be noted that not every embodiment may include all of these subsystems, and other subsystems may be present in certain embodiments to help perform the functionality of such embodiments. As presented in FIG. 1, these various subsystems are generally communicatively coupled by a sandbox management bus 132 that facilitates communication between the subsystems. However, other architectures that allow communication between the subsystems in a manner that is sufficient to permit the functioning of embodiments may be used.

The basic tasks involved in managing sandbox environment instances are performed by instantiation unit 142, testing unit 144, restoration unit 146, and comparison unit 148. It may be noted that comparison unit 148 may perform a comparison between multiple sandbox environment instances, which is an optional feature that is not required in every embodiment.

In addition to the functional units listed above, sandbox management unit 140 may incorporate certain data structures that are part of sandbox management unit 140 and that are manipulated as part of the operation of the function units listed above. Example data structures include a golden state definition 150, a first testing sandbox environment instance 160, and a second testing sandbox environment instance 170. It is to be noted that these example data structures are merely examples, and other relevant and similar data structures may be stored as part of sandbox management unit 140, even though they are not shown as part of FIG. 1. For example, one sample golden state definition and two testing sandbox environment instance are presented in FIG. 1, but it may be recognized that it is certainly possible for embodiments to work with more golden state definitions or testing sandbox environment instances.

Golden state definition 150 includes component configurations 152 and service configurations 154. Similarly, first testing sandbox environment instance 160 includes component configurations 162 and service configurations 164, and second testing sandbox environment instance 170 includes component configurations 172 and service configurations 174. These various configurations will be discussed in greater depth later. However, it should be noted that one way in which the configurations may be stored and/or represented is through use of a configuration language file. For example, this configuration language may be GCL. The use of GCL as the configuration language is illustrated by example in FIG. 3.

Additionally, FIG. 1 depicts manual bootstrapping unit 178. In one embodiment, golden state definition 150 may be constructed using manual bootstrapping. For example, a command-line tool may support creating an environment via a snapshot of an already-existing golden environment, which may be created via a manual bootstrap process. In such an approach, user 194 manually constructs golden state definition 150. An alternative approach may include creating a new environment from a bootstrap specification or from other external sources.

In general, in computer system 100, the system includes processors 102A-102N and memory 104 coupled to the processors 102A-102N. Sandbox management unit 140, which is also a part of computer system 100, operates by using the processors 102A-102N and the memory 104 to manage sandboxes.

As a part of the operation of sandbox management unit 140, instantiation unit 142, testing unit 144, and restoration unit 146 are each configured to carry out part of the functionality of some embodiments.

Instantiation unit 142 is configured to instantiate a first testing sandbox environment instance to a known state based on a golden state definition, wherein the golden state definition specifies configurations of at least one component and at least one service for the first testing sandbox environment instance. The instantiation process is discussed in greater depth, below.

Testing unit 144 is configured to perform a testing operation using the first testing sandbox environment instance by changing the configuration of at least one component or service of the first testing sandbox environment instance without changing the golden state definition. The testing process is discussed in greater depth, below.

Restoration unit 146 is configured to restore the first testing sandbox environment instance to the known state using the golden state definition to only restore configurations of the at least one component or service of the first testing sandbox environment instance that were changed. The restoration process is discussed in greater depth, below.

Additionally, comparison unit 148 is configured to perform side-by-side comparisons between multiple sandbox environment instances, or between a sandbox environment instance and a golden state definition. Examples of how this occurs are presented below in connection with FIGS. 8-9, below.

More detail about system embodiments, as well as more advanced features, will now be presented below in connection with discussion of several method embodiments.

Overview of the Method

Figure 2:
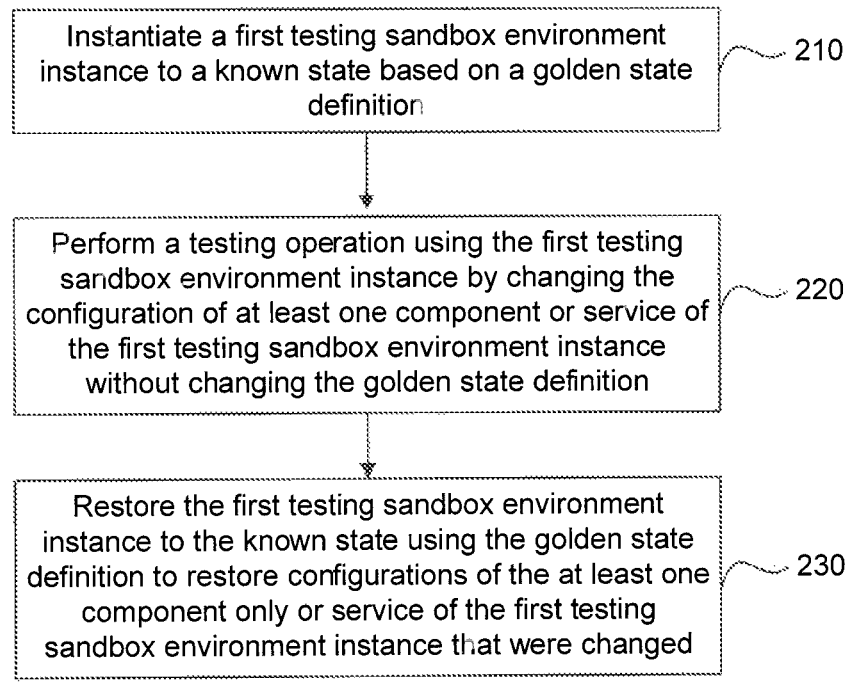
FIG. 2 is a flowchart of the method of one embodiment.

FIG. 2 is a flowchart of the method of one embodiment.

In stage 210, a first testing sandbox environment instance is instantiated to a known state based on a golden state definition. In embodiments, the golden state definition specifies configurations of at least one component and at least one service for the first testing sandbox environment instance. For example, sandbox management unit 140 may use instantiation unit 142 to access component configurations 152 and service configurations 154 within golden state definition 150 using sandbox management bus 132. It may be noted that golden state definition 150 may have been constructed, as discussed above, by manual bootstrapping, such as through the use of manual bootstrapping unit 178 by user 194. Based on golden state definition 150, instantiation unit 142 can establish a "snapshot" of the golden state, which may be represented in a configuration language such as GCL. Based on the snapshot, instantiation unit 142 can then create first testing sandbox environment instance 160 and set component configurations 162 and service configurations 164 appropriately.

In stage 220, a testing operation is performed using the first testing sandbox environment instance. In an embodiment, the testing operation is performed by changing the configuration of at least one component or service of the first testing sandbox environment instance without changing the golden state definition. For example, testing unit 144 may change a component configuration from component configurations 162 or a service configuration from service configurations 164 within first testing sandbox environment instance 160. More detail about how these configurations are changed will be presented in the discussion of FIGS. 5-6.

In stage 230, once the testing operation is complete, the first testing sandbox environment instance is restored to the known state using the golden state definition to only restore configurations of the at least one component or service of the first testing sandbox environment instance that were changed. In embodiments, the restoring does not require restoring configurations of any component or service of the testing sandbox environment that were not changed. For example, restoration unit 146 may examine first testing sandbox environment instance 160 to determine which configurations have changed, and selectively restore changed configurations. Such an approach, which may use copy-on-write techniques, is presented in FIGS. 7A-B. However, it is not required that restoration only restore changed configurations. In another embodiment, all configurations may be refreshed, or configurations in addition to those that have changed may be refreshed.

Examples of Use

FIG. 3 is a listing of a sample sandbox GCL configuration file. A sandbox GCL configuration file defines the configuration for a particular sandbox. A sandbox is composed of one or more sandlets (sandbox components that correspond to sandboxable systems made of state and service components).

Each sandlet has a GCL file that defines the base sandlet configuration, and a sandbox configuration imports these and nests them to define the sandbox. FIG. 3 presents a sample GCL sandbox configuration file 300. For example, in FIG. 3 the T2L Integ sandbox represents a sandbox composed of three sandlets: a DataCombiner, a MasterRepository, and a DataExporter.

A sandlet configuration has several parts. First, it has an instance name attribute (used to parameterize the instance of the sandbox). It also has a class name (e.g., in Python) that represents the backing class implementing this sandlet, a params tuple (used to build the configuration dictionary that the class constructs with and parameterizes the state and service components), a state components tuple, defining each of the state components that are part of this sandlet, and a service components tuple, defining each of the service components that are part of this sandlet. For example, supported types of state and service components may include components defined in a language, such as a "Python-defined component." Such a component may act as a pass-through to an instance method on the class that returns the fully-built component. A sandlet may also include a "bigtable component" that is a state component for a bigtable, allowing specification of name, cell, and time_to_live in seconds. It will be recognized that these are illustrative examples and should not be considered to be limiting.

It may be recognized that FIG. 3 is simply an illustrative use of a particular configuration language, in this case GCL, to help define a testing sandbox environment instance. Other embodiments may employ other uses of configuration languages, including GCL and other configuration languages.

For example, golden state definition 150 may be defined in such a configuration language. Similarly, configuration of services and/or state components may be manipulated by using definitions in a configuration language. These approaches will be detailed in greater depth, below.

Figure 4A:
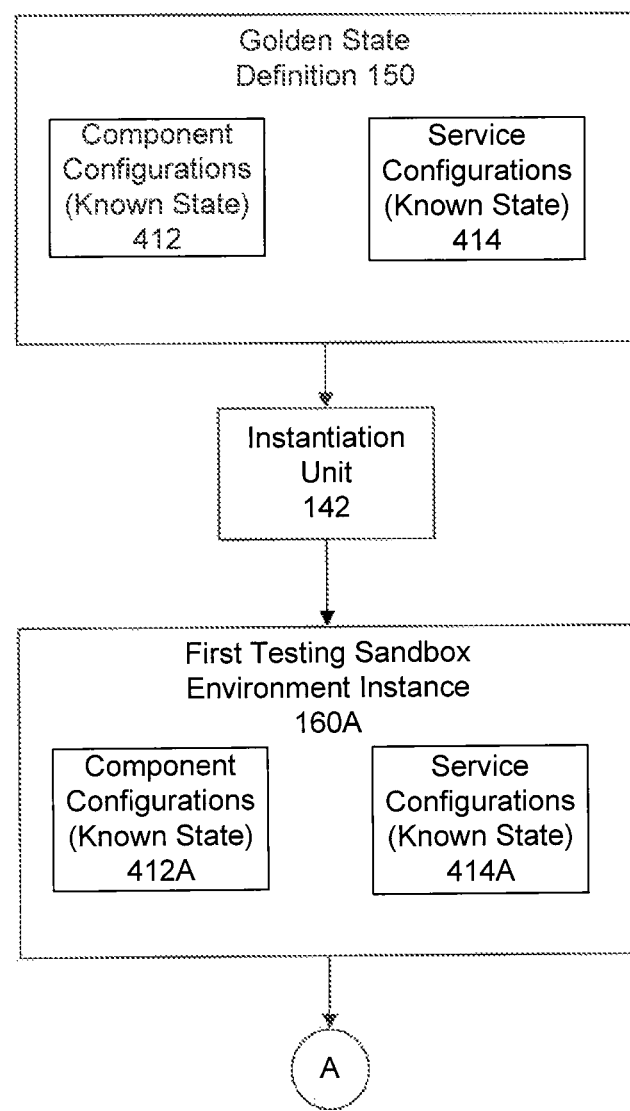
FIGS. 4A-4C are diagrams illustrating overall data flow through an example system.
Figure 4B:
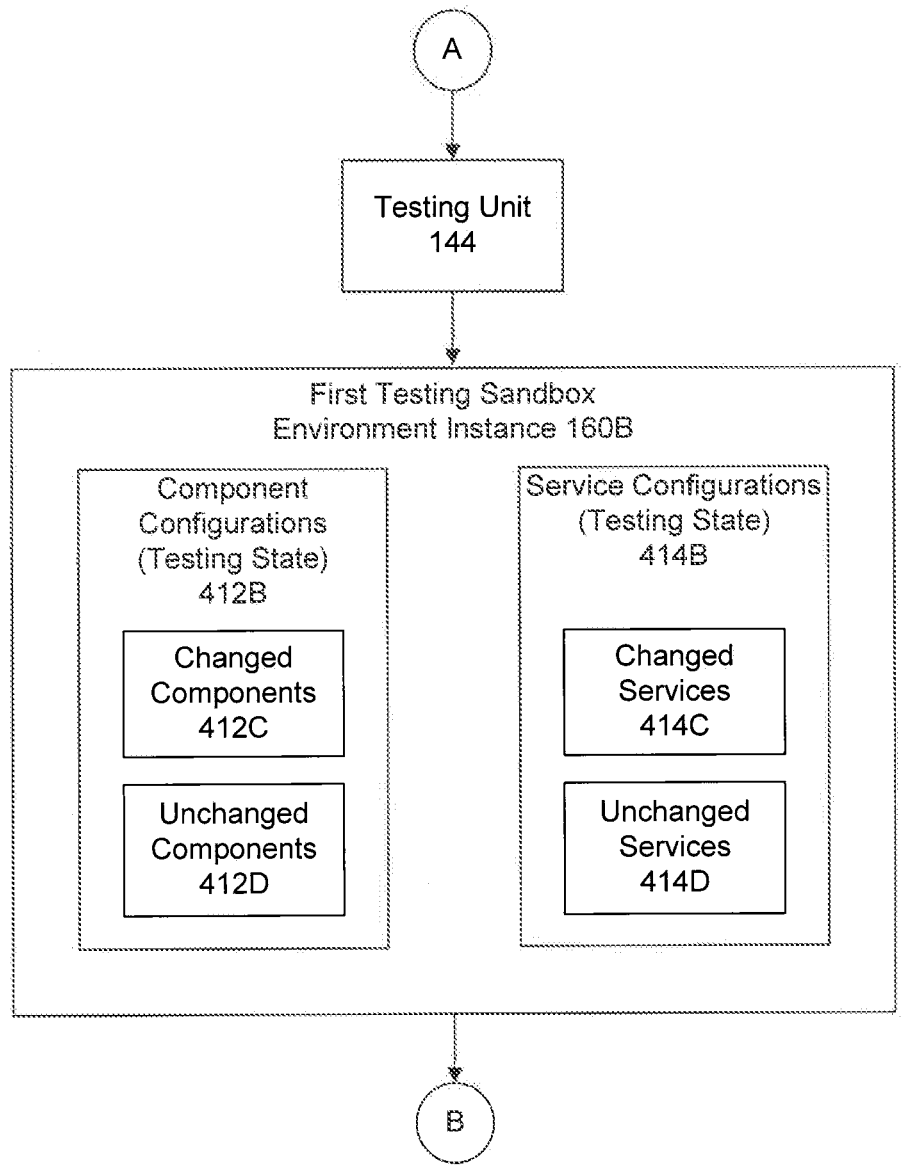
Figure 4C:
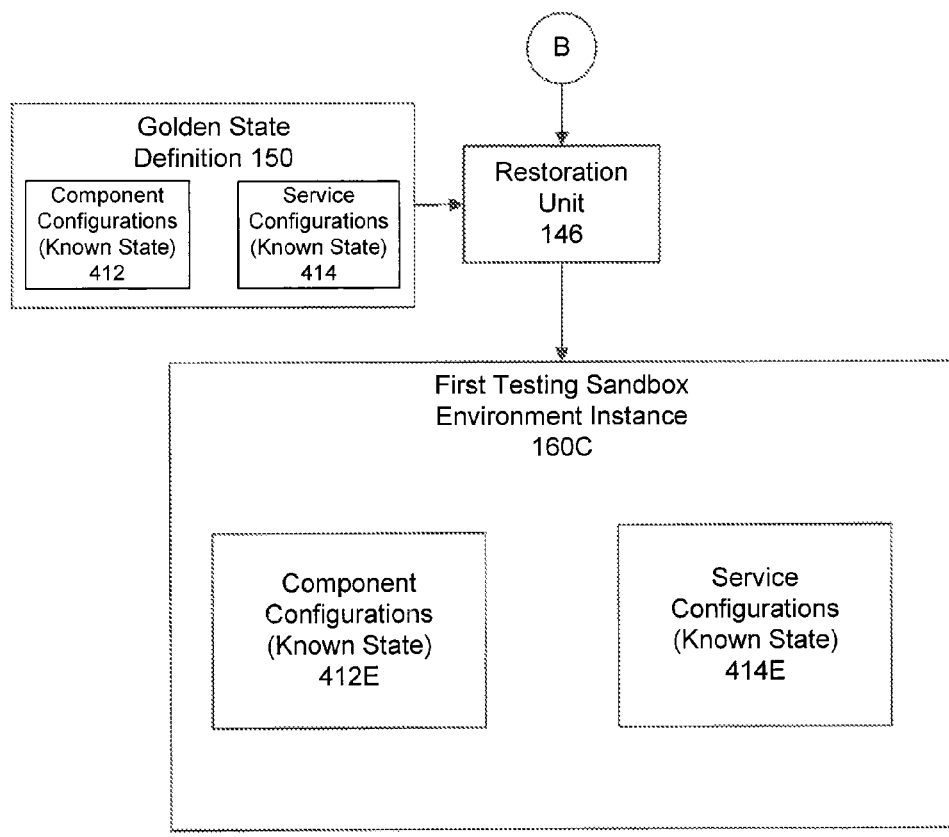

FIGS. 4A-4C are diagrams illustrating overall data flow through an example system. FIG. 4A shows that data flow, in an embodiment, begins with golden state definition 150, which may include component configurations (in a known state) 412, and service configurations (in a known state) 414. For example, golden state definition 150 may have been set up by manual bootstrapping, as previously discussed. Instantiation unit 142 operates on golden state definition 150. Golden state definition may be defined in a configuration language or another manner of storing configurations.

Instantiation unit 142 instantiates first testing sandbox environment instance 160A. At this point, first testing sandbox environment instance 160A includes component configurations (in a known state) 412A, and service configurations (in a known state) 414A. Data flow continues to testing unit 144, as shown in FIG. 4B. After testing unit 144 processes first testing sandbox environment instance 160A, testing unit 144 becomes first testing sandbox environment instance 160B. First testing sandbox environment instance 160B includes component configurations (in a testing state) 412B, which may be subdivided into changed components 412C and unchanged components 412D. Similarly, first testing sandbox environment instance 160B includes service configurations (in a testing state) 414B, which may be subdivided into changed services 414C and unchanged services 414D.

Data flow continues to restoration unit 146, as shown in FIG. 4C. However, it should also be noted that restoration unit 146 draws upon information from golden state definition 150, which may include component configurations (in a known state) 412, and service configurations (in a known state) 414. It is important to note that golden state definition remained unchanged, facilitating the restoration process. After restoration unit 146 is finished, first testing sandbox environment instance 160B includes component configurations (in a known state) 412E, and service configurations (in a known state) 414E. More detail will be provided subsequently, but it may be noted that restoration by restoration unit 146 only requires restoring changed components 412C and changed services 414C. This approach may be implemented by copy-on-write techniques, which will be discussed in greater detail below.

It may be noted that while FIGS. 4A-C only show one testing operation by testing unit 144 followed by one restoration by restoration unit 146, it is certainly possible to perform multiple tests, and to restore at any time.

Figure 5:
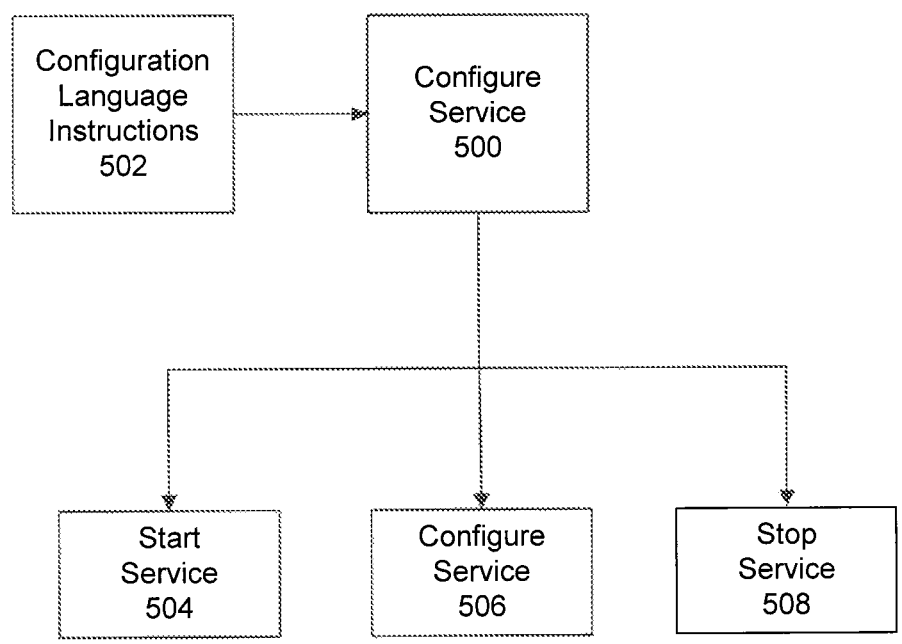
FIG. 5 is a diagram indicating various ways of changing a service configuration.

FIG. 5 is a diagram indicating various ways of changing a service configuration. FIG. 5 illustrates using configuration language instructions 502 to configure a service 500. Configuration language instructions 502 may include GCL instructions. However, changing service configurations does not actually require configuration language instructions 502, and other approaches may be used to configure a service 500. For example, certain actions that may be performed to configure a service are actions to start a service 504, configure a service 506, or stop a service 508. For example, an interface such as a command-line interface (discussed below) may provide a user with the ability to change a service configuration.

Figure 6:
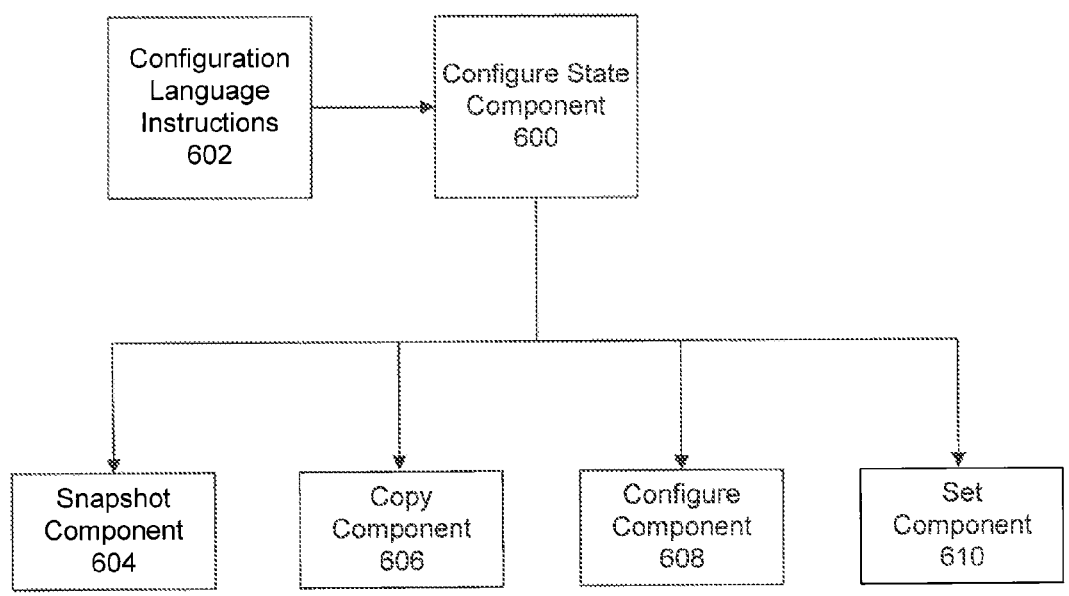
FIG. 6 is a diagram indicating various ways of changing a state component configuration.

FIG. 6 is a diagram indicating various ways of changing a state component configuration. FIG. 6 illustrates using configuration language instructions 602 to configure a state component 600. Configuration language instructions 602 may include GCL instructions. However, changing state component configurations does not actually require configuration language instructions 602, and other approaches may be used to configure a state component 600. For example, certain actions that may be performed to configure a state component are to snapshot a component 604, copy a component 606, configure a component 608, or set a component 610.

Figure 7A:
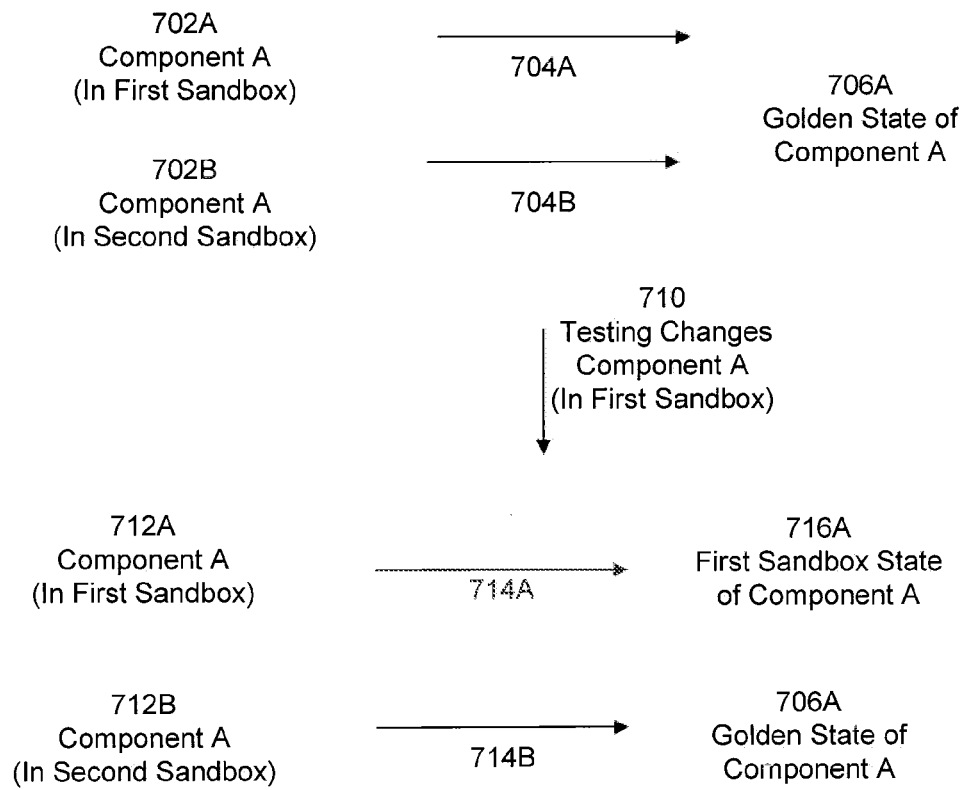
FIGS. 7A-7B are diagrams illustrating the use of a copy-on-write approach while testing.
Figure 7B:
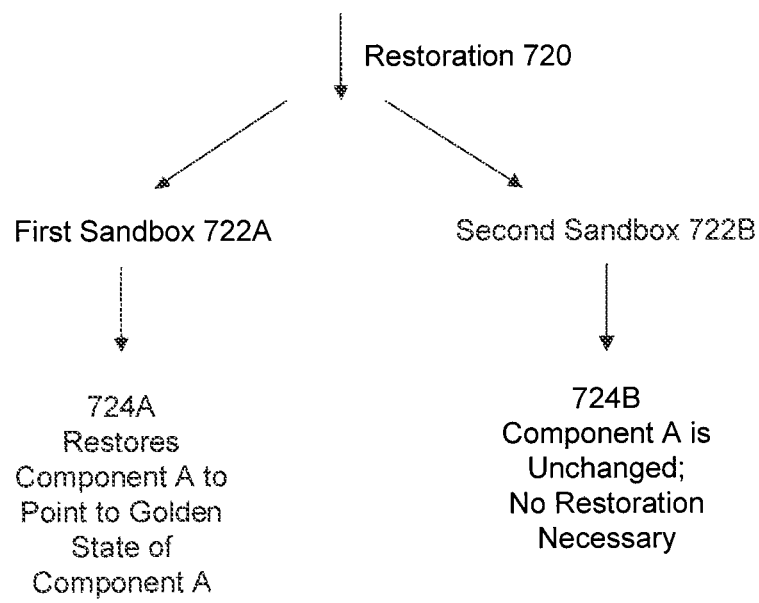

FIGS. 7A-7B are diagrams illustrating the use of a copy-on-write approach while testing. In a copy-on-write approach, items which refer to the same piece of information may begin as pointers, which are then updated to point to a new copy when the information actually changes. In the context of this discussion of FIGS. 7A-7B, it is assumed that first testing sandbox environment instance 160 and second testing sandbox environment instance 170 have each been instantiated based on golden state definition 150. In FIGS. 7A-B, the first testing sandbox environment instance 160 and second testing sandbox environment instance 170 are referred to as "first sandbox" and "second sandbox" for simplicity's sake.

At the top of FIG. 7A, component (in a first sandbox) 702A points 704A to golden state 706A of component A, and component (in a second sandbox) 702B points 704B to golden state 706A of component A. This approach works because after the first sandbox and second sandbox are instantiated, components 702A and 702B each refer to the same golden state 706A of component A.

However, suppose that testing changes component A, but only in the first sandbox. After this testing occurs, the first sandbox will point 714A to its own copy of first sandbox state 716A of component A. However, component A in second sandbox 712B will still point 714B to the golden state 706A of component A because there was no change to the component in the second sandbox.

The process continues in FIG. 7B, which shows how the steps of FIG. 7A affect restoration. Suppose that the two sandboxes of FIG. 7A undergo restoration 720. FIG. 7B shows how different approaches are relevant for first sandbox 722A and second sandbox 722B. For first sandbox 722A, restoration 720 restores component A to point to golden state 706A of component A 724A, because it was changed and needs to have the pointer to resume pointing to the original golden state. By contrast, for second sandbox 724B, restoration 720 leaves component A as unchanged, because no restoration is necessary.

Various approaches may be used to signal when a service or state component has been changed, such as setting a flag. However, this example should not be taken as limiting and a wide range of techniques may establish when restoration is necessary. Also, as noted, embodiments are not limited to restoring only when necessary, and may additionally restore otherwise as desired.

Figure 8:
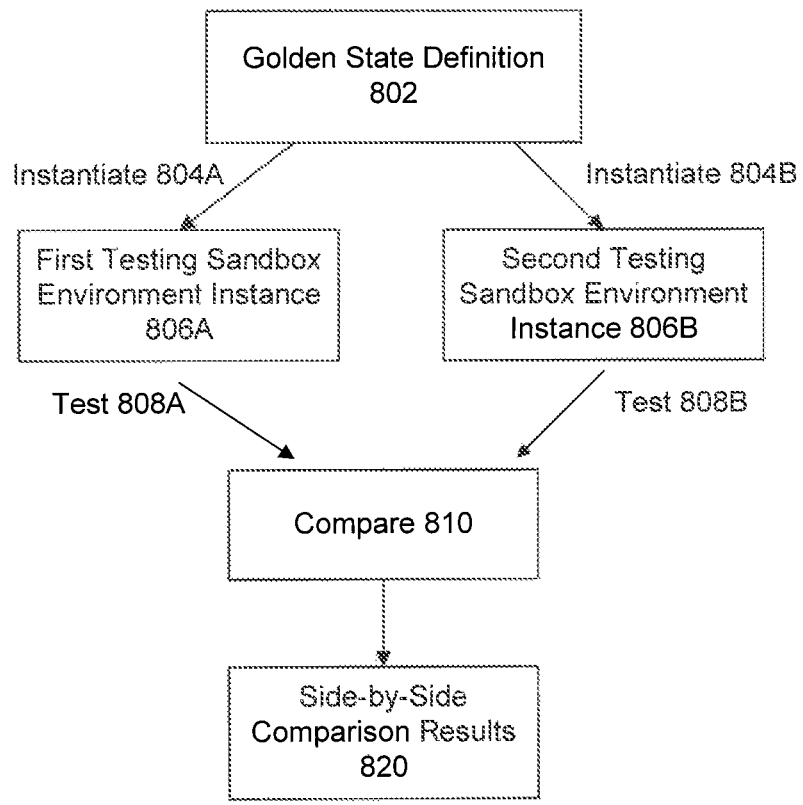
FIG. 8 is a diagram illustrating side-by-side comparison for two testing sandbox environment instances.

FIG. 8 is a diagram illustrating a side-by-side comparison for two example testing sandbox environment instances. FIG. 8 begins with a golden state definition 802. In parallel, golden state definition 802 is passed to instantiation unit 142 to instantiate 804A first testing sandbox environment instance 806A and to instantiate 804B second testing sandbox environment instance 806B. First testing sandbox environment instance 806A undergoes a test 808A. Second testing sandbox environment instance 806B undergoes a test 808B. After this occurs, comparison unit 148 can compare 810 first testing sandbox environment instance 806A and second testing sandbox environment instance 806B, to produce side-by-side comparison results 820. The side-by-side comparison results 820 can provide information about first testing sandbox environment instance 806A and second testing sandbox environment instance 806B, such as what components and services each one includes, as well as what the configurations of those components and services are. This approach allows user 194 to easily compare the results of separate tests of first testing sandbox environment instance 806A and second testing sandbox environment instance 806B, each carrying out a test in its own sandbox.

Figure 9:
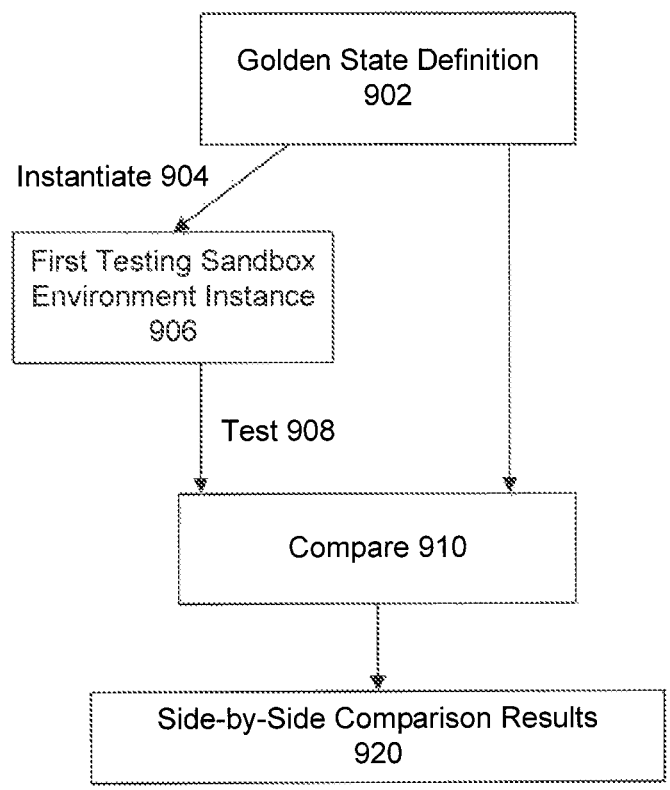
FIG. 9 is a diagram illustrating side-by-side comparison for a first testing sandbox environment instance and a golden state definition.

FIG. 9 is a diagram illustrating a side-by-side comparison for an example first testing sandbox environment instance and an example golden state definition. FIG. 9 begins with a golden state definition 902. Golden state definition 902 is passed to instantiation unit 142 to instantiate 904 first testing sandbox environment instance 906. First testing sandbox environment instance 906 undergoes a test 908. After this occurs, comparison unit 148 can compare 910 first testing sandbox environment instance 906 and golden state definition, to produce side-by-side comparison results 920.

Figure 10:
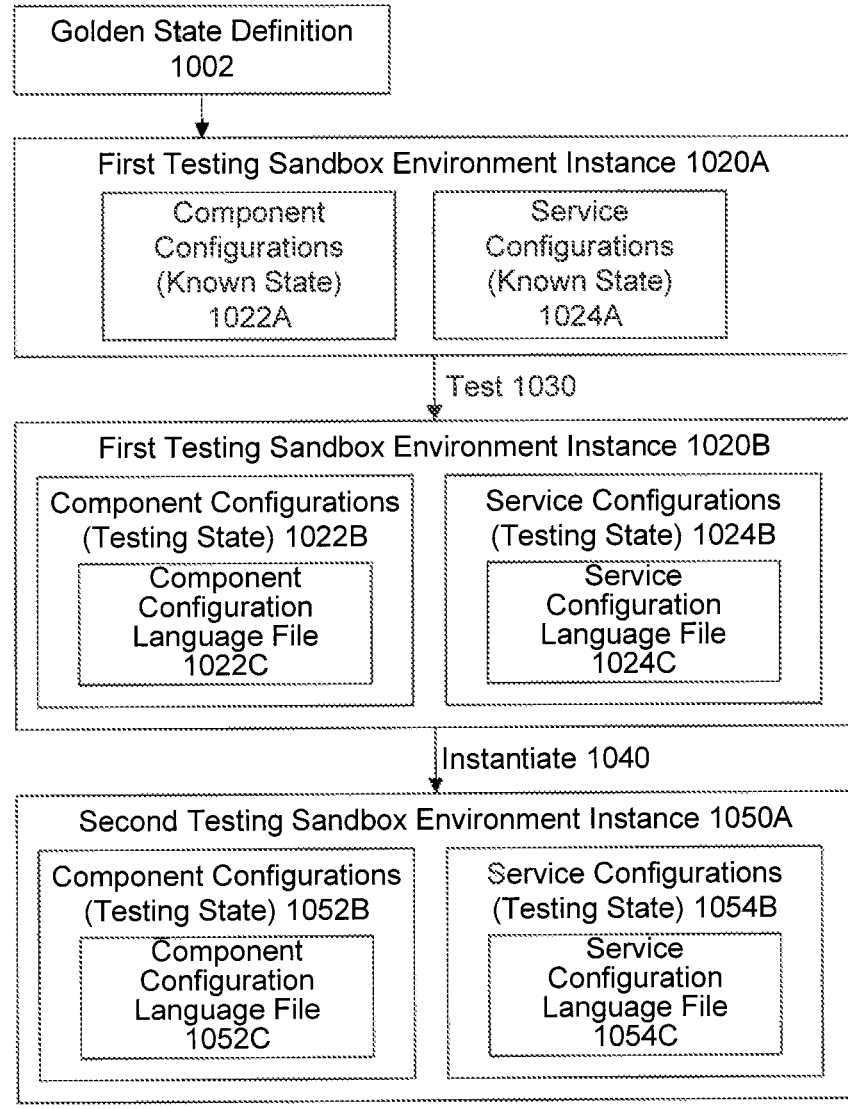
FIG. 10 is a diagram illustrating data flow through an example system that instantiates a second testing sandbox environment instance from a first testing sandbox environment instance.

FIG. 10 is a diagram illustrating data flow through an example system that instantiates a second testing sandbox environment instance from a first testing sandbox environment instance. FIG. 10 begins with a golden state definition 1002. Golden state definition 1002 is passed to instantiation unit 142 to instantiate first testing sandbox environment instance 1020A. At this point, first testing sandbox environment instance 1020A contains component configurations (in a known state) 1022A and service configurations (in a known state) 1024A.

Subsequently, first testing sandbox environment instance 1020A under goes a test 1030 and becomes first testing sandbox environment instance 1020B. At this point, first testing sandbox environment instance 1020B contains component configurations (in a testing state) 1022B, defined by component configuration language file 1022C. First testing sandbox environment instance 1020B also contains service configurations (in a testing state) 1024B, defined by service configuration language file 1024C.

It then becomes possible to instantiate 1040 second testing sandbox environment instance 1050A. Second testing sandbox environment instance 1050A includes component configurations (in a testing state) 1052B, which may be defined in a component configuration language file 1052C. Second testing sandbox environment instance 1050A also contains service configurations (in a testing state) 1054B, which may be defined in a service configuration language file 1054C. The configuration language files may facilitate instantiating second testing sandbox environment instance 1050A in a way that causes second testing sandbox environment instance 1050A to essentially be a clone of first testing sandbox environment instance 1020B. This ability to clone testing sandbox environment instances is useful, because it permits, for example, the ability to back up a sandbox environment instance before performing additional testing on the sandbox environment instance.

As discussed above, a sandbox manager may be operated with a variety of interfaces. These may include both command-line interfaces and automated testing frameworks.

Command-line interfaces allow manual control of the various functions that a sandbox manager can perform.

An example command-line interface is as follows:
sandman config_file command (command-line options)

For example, sample commands that may be implemented as part of Sandbox Manager are specified in Table 1A, below. Sample command-line options are provided in Table 1B. It may be noted that these are simply examples of a command-line interface to a particular implementation of a sandbox manager, and various implementations may include different or additional commands, or omit commands that are provided here.

TABLE 1A

Sandbox Manager Command Reference

| Command | Description |
|---|---|
| SetUp | Create an instance of the defined sandbox via snapshot of a golden instance. Uses the --golden_config command-line option. |
| TearDown | Stop and remove all service components and remove all state components comprising this sandbox instance. |
| Update | TearDown and SetUp |
| Start | Start all of the service components defined as part of this sandbox instance. |
| Stop | Stop all of the service components defined as part of this sandbox instance. |

TABLE 1B

Sandbox Manager Command-line Options

| Option | Description |
|---|---|
| vars | Comma-separated list of <key>=<value> pairs that is used to override the 'vars' section in the main config file. This allows config files to use parameters that can be overridden on the command-line. Example: sandman mandel_pie.gcl Start --vars=cell=wh (where cell is a runtime parameter defined in the config file.) |
| golden_config | A config file used to specify the source sandbox to be snapshotted during the SetUp operation. Required only for SetUp and Update. |
| golden_config_vars | Like vars, but applied to the golden_config file as opposed to the main config file. |
| local_binary_root_dir | The directory representing the root directory from which binaries can be read when staging files. |
| borgcfg_overwrite | If true, overwrite the generated config files (defaults to false in order to preserve personal manual modifications). |
| logtostderr | Log output to STDERR |

Example Command-Line Uses

The following are example actions that a user might take, using a command-line interface:

Set up a new sandbox named XXX from golden AAA.

Tear down the XXX sandbox above, regenerating configuration files, logging to stderr, using a prebuilt file and using srcfs for all dependencies.

Set up a new default sandbox named YYY in cluster, e.g., from empty.

Tear down the ie YYY sandbox above, regenerating configuration files, logging to stderr, using a prebuilt file and using srcfs for all dependencies.

Start the multi-sandlet sandbox specified by GCL file with an alternate name.

Set up, Start, and Tear Down the default dataexporter sandbox cloned from empty, logging to stderr, using a prebuilt file.

Use with Automated Testing Frameworks

In general, automated testing frameworks work in tandem with a sandbox manager to facilitate software testing and evaluation. Generally, automated testing frameworks provide testing through several stages. First, the automated testing framework manages defining the testing sandbox. Performing this task requires less user involvement when performed by the automated testing framework than when done manually via the command-line interface, but a command-line interface can also give users greater control over how the sandbox is defined.

Next, an automated testing framework allows users to write tests that interact with the sandbox. One example pattern for these tests includes Python tests that, in TestCaseSetUp link in the sandbox parser, have direct access to the Python sandbox definition classes. In this model, the test can access the endpoints via the GetExtenialEndpoint methods. The test accesses the sandbox GCL file and takes in any vars (see Table 1B) (such as instance name) as flags so that the test can be parameterized to run against a particular sandbox environment. An alternative pattern for the tests may include tests in any language that take in all endpoints as flags. In this case, if running the test manually, the user may need to know all of the correct values for each endpoint the test needs to interact with.

In both cases, because the test will most likely be interacting directly with live system instances, it may be defined as a local, manual test. Also, it is helpful for the test itself to properly manage environment variables to ensure that real system resources are used, when appropriate. For example, it is possible to manually run a test to check in advance that it is appropriate.

After these steps it is possible to start implementing automated testing workflow to automate deployment and test execution. This can be done using a variety of approaches, although certain configuration work may be necessary to allow the automated testing framework to interface properly with a sandbox manager.

The disclosed embodiments incorporate a variety of features in new and advantageous ways. They provide for easily and conveniently managing multiple separate instances of a complex system. The included features facilitate easy testing and evaluation of system configurations by making managing instances simpler and more efficient. For example, embodiments accomplish this by taking advance of configuration languages, golden states, and copy-on write approaches in an advantageous combination that makes it easy to automate testing and evaluation of any system while also permitting direct user control of how the testing and evaluation is implemented.

The Summary and Abstract sections may set forth one or more but not all exemplary embodiments as contemplated by the inventor(s), and thus, are not intended to limit the present embodiments and the appended claims in any way.

The present embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described exemplary embodiments, but should be defined only in accordance with the following claims and their equivalents.

What is claimed is:

1. A computer-implemented method for managing sandbox environment instances, the method comprising:
   instantiating a first testing sandbox environment instance to a known state based on a golden state definition, wherein the golden state definition specifies configurations of at least one component and at least one service for the first testing sandbox environment instance;
   performing a testing operation using the first testing sandbox environment instance by changing the configuration of at least one component or service of the first testing sandbox environment instance without changing the golden state definition, wherein the configuration of the at least one component or service of the first testing sandbox environment instance is placed in a testing state;
   determining changes between the configurations of the at least one component or service of the first testing sandbox environment instance and the configurations of the at least one component and at least one service of the golden state definition after performing the testing operation; and
   selectively restoring the first testing sandbox environment instance to the known state using the determined changes to only restore configurations of the at least one component or service of the first testing sandbox environment instance that were changed.

2. The method of claim 1, wherein the golden state definition is defined in a configuration language.

3. The method of claim 1, wherein restoring the first testing sandbox environment uses copy-on-write techniques to establish which configurations of the at least one component or service of the first testing sandbox environment instance were changed when performing the testing operation.

4. The method of claim 1, further comprising:
   repeating the instantiating and performing for a second testing sandbox environment instance, wherein the configurations of at least one component or service of the first testing sandbox environment instance differ from the configurations of at least one component or service of the second testing sandbox environment instance after performing the testing operations; and
   performing a side-by-side comparison of the first testing sandbox environment instance and second testing sandbox environment instance.

5. The method of claim 1, further comprising performing a side-by-side comparison of the first testing sandbox environment instance and the golden state definition after performing the testing operation.

6. The method of claim 1, further comprising:
   instantiating a second testing sandbox environment instance at a known state based on the configurations of at least one component and at least one service for the first testing sandbox environment instance.

7. The method of claim 1, wherein the golden state definition is constructed using manual bootstrapping.

8. A system for managing sandboxes, the system comprising:
   a processor;
   a memory coupled to the processor; and
   a sandbox management unit, configured to use the processor and the memory to manage sandboxes, the sandbox management unit comprising:
      an instantiation unit, configured to instantiate a first testing sandbox environment instance to a known state based on a golden state definition, wherein the golden state definition specifies configurations of at least one component and at least one service for the first testing sandbox environment instance;
      a testing unit, configured to perform a testing operation using the first testing sandbox environment instance by changing the configuration of at least one component or service of the first testing sandbox environment instance without changing the golden state definition, wherein the configuration of the at least one component or service of the first testing sandbox environment instance is placed in a testing state; and
      a restoration unit configured to:
         determine changes between the configurations of the at least one component or service of the first testing sandbox environment instance and the configurations of the at least one component and at least one service of the golden state definition after performing the testing operation; and
         selectively restore the first testing sandbox environment instance to the known state using the determined changes to only restore configurations of the at least one component or service of the first testing sandbox environment instance that were changed.

9. The system of claim 8, wherein the golden state definition is defined in a configuration language.

10. The system of claim 8, wherein the restoration unit, when it restores the first testing sandbox environment, uses copy-on-write techniques to establish which configurations of the at least one component or service of the first testing sandbox environment instance were changed when performing the testing operation.

11. The system of claim 8, wherein the instantiation unit and the testing unit are further configured to repeat the instantiating and performing for a second testing sandbox environment instance, wherein the configurations of at least one component or service of the first testing sandbox environment instance differ from the configurations of at least one component or service of the second testing sandbox environment instance after performing the testing operations; and wherein the sandbox management unit further comprises a comparison unit, configured to perform a side-by-side comparison of the first testing sandbox environment instance and second testing sandbox environment instance.

12. The system of claim 8, wherein the sandbox management unit further composes a comparison unit, configured to perform a side-by-side comparison of the first testing sandbox environment instance and the golden state definition after performing the testing operation.

13. The system of claim 8, wherein the instantiation unit is further configured to:
   instantiate a second testing sandbox environment instance at a known state based on the configurations of at least one component and at least one service for the first testing sandbox environment instance.

14. The system of claim 8, further comprising a manual bootstrapping unit that is configured to construct the golden state definition using manual bootstrapping.

15. A computer readable storage medium having instructions stored thereon that, when executed by one or more processors, cause the processors to execute operations for managing sandboxes, the operations comprising:

instantiating a first testing sandbox environment instance to a known state based on a golden state definition, wherein the golden state definition specifies configurations of at least one component and at least one service for the first testing sandbox environment instance;

performing a testing operation using the first testing sandbox environment instance by changing the configuration of at least one component or service of the first testing sandbox environment instance without changing the golden state definition, wherein the configuration of the at least one component or service of the first testing sandbox environment instance is placed in a testing state;

determining changes between the configurations of the at least one component or service of the first testing sandbox environment instance and the configurations of the at least one component and at least one service of the golden state definition after performing the testing operation; and selectively restoring the first testing sandbox environment instance to the known state using the determined changes to only restore configurations of the at least one component or service of the first testing sandbox environment instance that were changed.

16. The computer-readable storage medium of claim 15, wherein the golden state definition is defined in a configuration language.

17. The computer-readable storage medium of claim 15, wherein the operation of restoring the first testing sandbox environment uses copy-on-write techniques to establish which configurations of the at least one component or service of the first testing sandbox environment instance were changed when performing the testing operation.

18. The computer-readable storage medium of claim 15, the operations further comprising:

repeating the instantiating and performing for a second testing sandbox environment instance, wherein the configurations of at least one component or service of the first testing sandbox environment instance differ from the configurations of at least one component or service of the second testing sandbox environment instance after performing the testing operations; and performing a side-by-side comparison of the first testing sandbox environment instance and second testing sandbox environment instance.

19. The computer-readable storage medium of claim 15, the operations further comprising performing a side-by-side comparison of the first testing sandbox environment instance and the golden state definition after performing the testing operation.

20. The computer-readable storage medium of claim 15, the operations further comprising:

instantiating a second testing sandbox environment instance at a known state based on the configurations of at least one component and at least one service for the first testing sandbox environment instance.

\* \* \* \* \*